United States Patent
Xiong et al.

(10) Patent No.: US 11,429,810 B2
(45) Date of Patent: Aug. 30, 2022

(54) QUESTION ANSWERING METHOD, TERMINAL, AND NON-TRANSITORY COMPUTER READABLE STORAGE MEDIUM

(71) Applicant: UBTECH ROBOTICS CORP LTD, Shenzhen (CN)

(72) Inventors: Weixing Xiong, Shenzhen (CN); Youjun Xiong, Shenzhen (CN); Hongtao Liao, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 373 days.

(21) Appl. No.: 16/727,946

(22) Filed: Dec. 27, 2019

(65) Prior Publication Data
US 2020/0210776 A1    Jul. 2, 2020

(30) Foreign Application Priority Data
Dec. 29, 2018   (CN) .......................... 201811640990.X

(51) Int. Cl.
G06K 9/00 (2022.01)
G06K 9/62 (2022.01)
G06F 17/16 (2006.01)
G06N 5/04 (2006.01)

(52) U.S. Cl.
CPC .......... *G06K 9/6257* (2013.01); *G06F 17/16* (2013.01); *G06K 9/6201* (2013.01); *G06N 5/04* (2013.01)

(58) Field of Classification Search
CPC .. G06K 9/6257; G06K 9/6201; G06K 9/6277; G06F 17/16; G06F 40/35; G06N 5/04; G06N 3/0427; G06N 3/0454; G06N 3/08; G06N 5/041
See application file for complete search history.

(56) References Cited

U.S. PATENT DOCUMENTS

| 10,817,509 | B2* | 10/2020 | Korpusik | G06N 3/08 |
| 2018/0341871 | A1* | 11/2018 | Maitra | G06N 3/0427 |
| 2020/0036659 | A1* | 1/2020 | Wu | G06F 40/30 |

FOREIGN PATENT DOCUMENTS

WO    WO-2020119031 A1 *  6/2020

* cited by examiner

*Primary Examiner* — Nancy Bitar
*Assistant Examiner* — Xiao Liu

(57) ABSTRACT

The present invention discloses a question answering method including obtaining a first question and a first category of the first question, combining the first question with each of preset second questions corresponding to the first category to form question groups, inputting the question groups into a trained deep retrieval matching classification model to obtain a first probability of a first classification label of each of the question groups, inputting the first question into a gradient boosting decision model to obtain a second category of the first question, obtaining a second category of the second questions, adjusting the first probability of the first classification label of each of the question groups, according to the second category of the second questions and the second category of the first question in each of the question groups, and outputting a reply according to adjusted first probabilities for solving a problem of low reply accuracy.

20 Claims, 6 Drawing Sheets

QUESTION ANSWERING METHOD, TERMINAL, AND NON-TRANSITORY COMPUTER READABLE STORAGE MEDIUM

CROSS REFERENCE TO RELATED APPLICATIONS

This application claims priority to Chinese Patent Application No. CN201811640990.X, filed Dec. 29, 2018, which is hereby incorporated by reference herein as if set forth in its entirety.

BACKGROUND

1. Technical Field

The present disclosure generally relates to communication technology, and particularly to a question answering method, a terminal, and a non-transitory computer readable storage medium.

2. Description of Related Art

Manual customer service is a typical labor-intensive industry with long working hours and high repeatability, so the human and management costs are greatly increased in many companies.

In this case, people can reduce the workload of the manual customer service by intelligent customer service. The intelligent customer service can perform search and matching operations according to a consulting question input by an user, and return preset answers or similar questions to the user. However, current intelligent customer service technologies, such as keyword matching search technology, and text relevance reordering technology, etc, have problems of low matching accuracy, poor correlation of return results, and low reply accuracy.

In summary, how to improve the matching precision in the intelligent customer service and the reply accuracy of the intelligent customer service has become an urgent problem to be solved by those skilled in the art.

BRIEF DESCRIPTION OP DRAWINGS

In order to more clearly illustrate the technical solutions in the embodiments of the present invention, the drawings used in the embodiments or the prior art description will be briefly introduced below, obviously. The drawings in the following description are only some embodiments of the present invention, and those skilled in the art without any creative labor can obtain other drawings according to the drawings.

DETAILED DESCRIPTION

Embodiments of the present invention provide a question answering method, a question answering device, a non-transitory computer readable storage medium and a terminal, which are used for solving the problems of low matching precision, poor correlation of reply content and low reply accuracy in the existing intelligent customer service technology, and to improve using experience of users.

In order to make the object, the features and the advantages of the present invention more obvious and understandable, in conjunction with the drawings in the embodiments of the present invention, the technical solutions in the embodiments of the present invention will be clearly and completely described below, obviously, the embodiments described below are only some of the embodiments of the present invention, but not all of the embodiments. Based on the embodiments of the present invention, all other embodiments obtained by those skilled in the art without creative labor are within the scope of the present invention.

Figure 1:
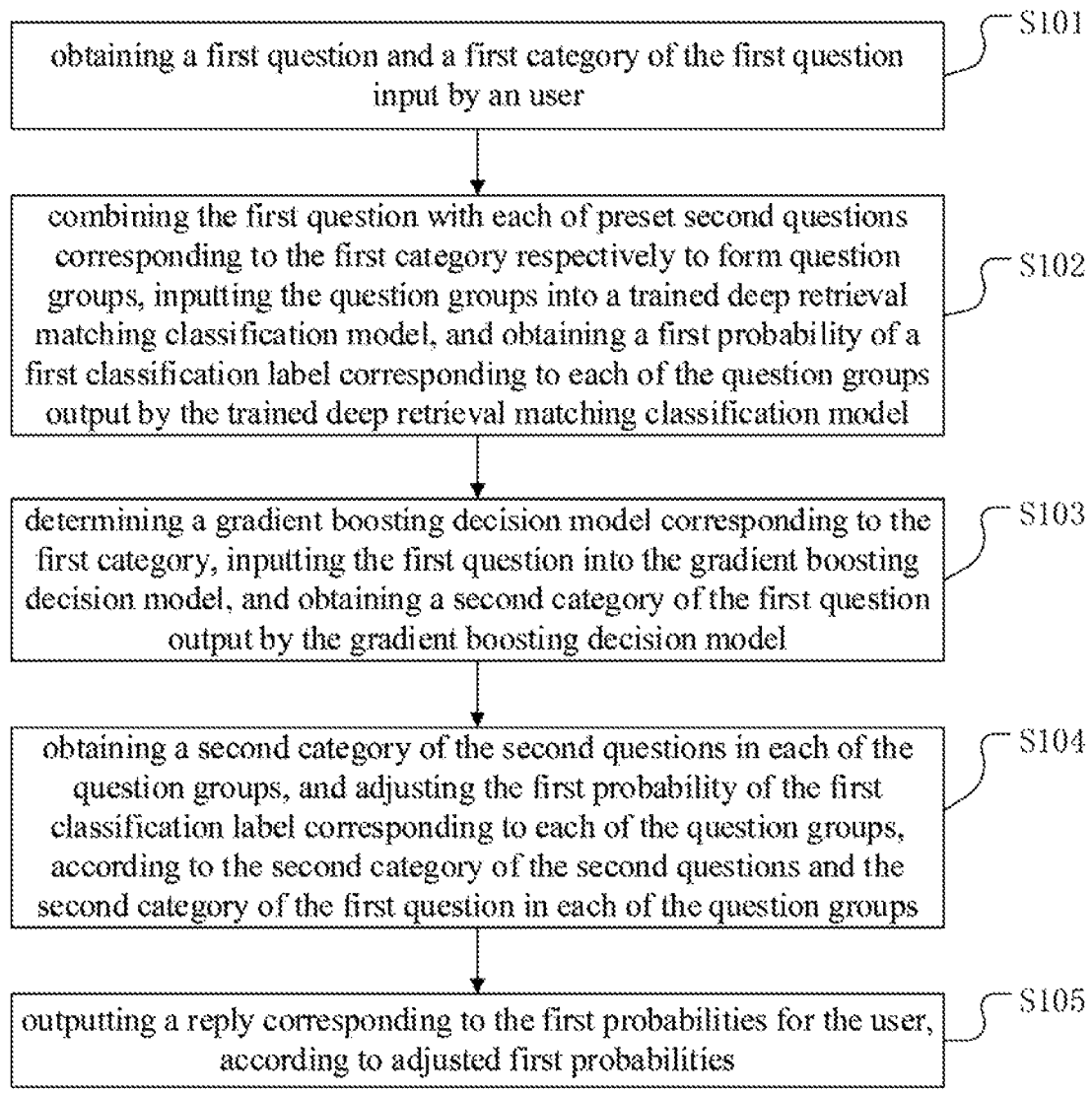
FIG. 1 is a flowchart of an embodiment of a question answering method according to an embodiment of the present invention.

Refer to FIG. 1, a flowchart of an embodiment of a question answering method according to an embodiment of the present invention. The question answering method includes the following steps S101 to S105.

In step S101: obtaining a first question and a first category of the first question input by an user.

The question answering method provided by the embodiment of the present invention can be applied to the intelligent customer service for answering the user's consultation questions. In the intelligent customer service, multi-level categories can be set for the questions that users need to consult, such as three-level categories, wherein, a first category is product category, a second category is consulting direction (such as basic knowledge, app questions, etc.), and a third category is details of the consulting direction (such as app questions can be subdivided into app operations, building process, and connection questions, etc.).

When an user inputs the first question to be consulted, the user may determine the first category of the first question by methods of a drop-down box, a check box, or a manual inputting, that is, determines the product category involved in the first question.

In step S102: combining the first question with each of preset second questions corresponding to the first category respectively to form question groups, inputting the question groups into a trained deep retrieval matching classification model, and obtaining a first probability of a first classification label corresponding to each of the question groups output by the trained deep retrieval matching classification model.

After the first question and the first category of the first question input by the user are obtained, the question groups are formed by combining the first question with each of the preset second questions corresponding to the first category respectively. The forms of the question group can be expressed as a first question, and a second question. The second question may be a common question for users. There can be its many question groups as there are corresponding second questions in the first category. For example, if there are tour second questions corresponding to the first category, four question groups can be formed.

After the question groups are formed, the question groups are input into the trained deep retrieval matching classification model, the first classification label corresponding to each of the question groups, and the first probabilities of the first classification label output by the trained deep retrieval matching classification model can be obtained. For example, the first classification label corresponding to the question group A can be obtained as A, and the first probability of the first classification label A can be obtained; for example, the first classification label corresponding to the question group B can be obtained as B, and the first probability of the first classification label B can be obtained, for example, the first classification label corresponding to the question group C can be obtained as C, and the first probability of the first classification label C can be obtained, etc. The first classification label may be any of 4, 3, 2, 1, and 0. The first probability is used to measure the degree of certainty of the judgment result of the deep retrieval matching classification model, such as the degree of certainty when the deep retrieval matching classification model determines that the first classification label corresponding to the question group A is 4. The meaning of 4, 3, 2, 1, and 0 will be described in the subsequent content.

Figure 2:
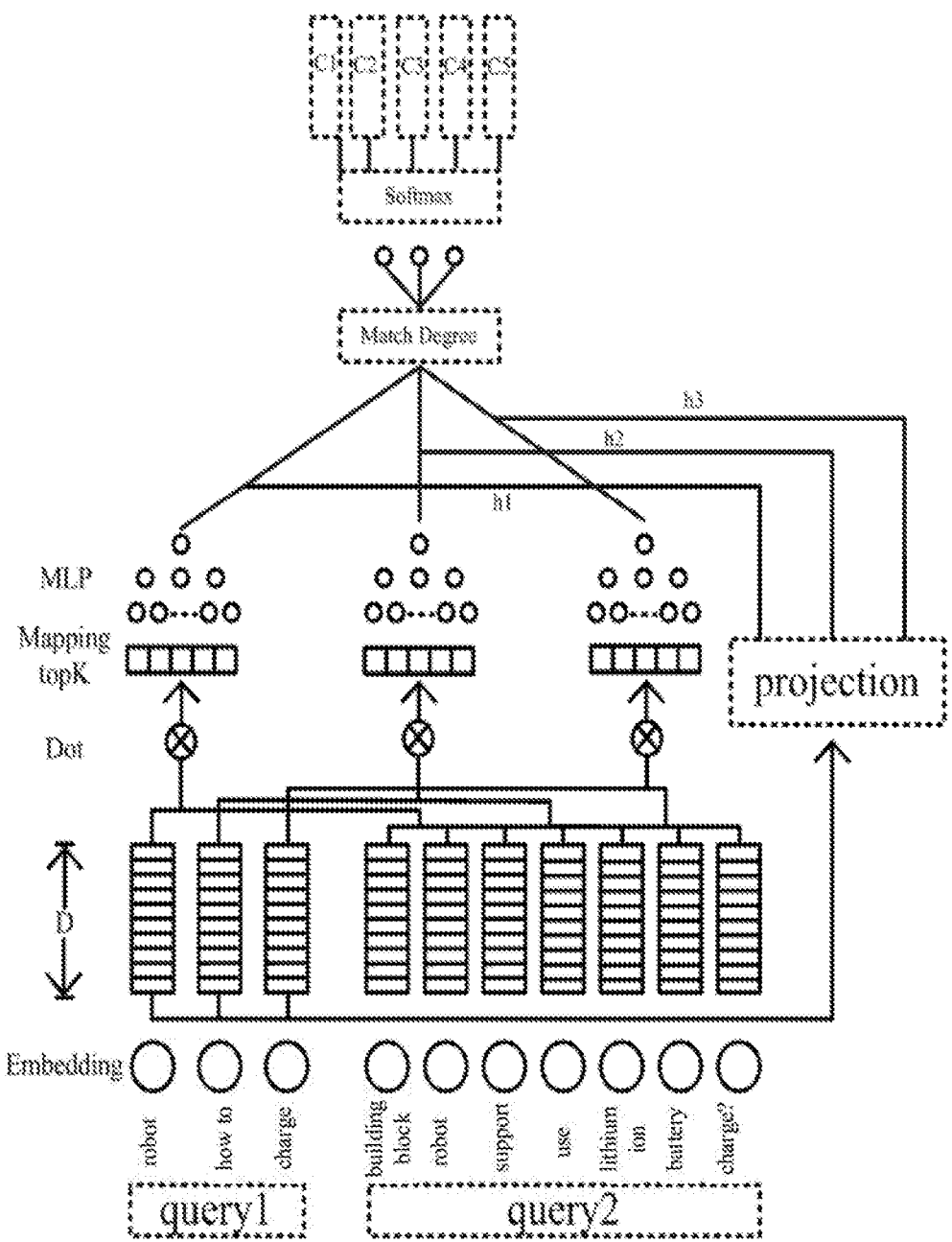
FIG. 2 is a processing flowchart of a trained deep retrieval matching classification model in the question answering method according to an embodiment of the present invention.

Further, as shown in FIG. 2, in the embodiments of the present invention, the deep retrieval matching classification model adopts the architecture of a deep neural network model. Specifically, the step of combining the first question with each of the preset second questions corresponding to the first category respectively to form the question groups, inputting the question groups into the trained deep retrieval matching classification model, and obtaining the first probability of the first classification label corresponding to each of the question groups output by the trained deep retrieval matching classification model, includes following steps S1021 to S1024:

In step S1021: segmenting the first question, obtaining a plurality of words, and combining segmented first question with each of the preset second questions corresponding to the first category respectively to form the question groups, wherein the preset second questions have been segmented.

After the first question and the first category of the first question input by the user are obtained, a word segmentation processing on the first question is performed, to divide the first question into multiple words and delete stop words and punctuation in words, such as deleting some simple connectives and mood particles, etc, to reduce the impact of meaningless words on meaningful words. In the embodiment, the preset second questions have been segmented in advance. The first question and the second questions can be divided into multiple words by the similar segmenting method. After the word segmentation processing, the question groups are formed by combining the first question after the word segmentation with each of the preset second questions corresponding to the first category.

In step S1022: converting words of the first question and words of the second questions in each of the question groups into word vectors by a preset word vector model.

After the question groups are formed, the words of the first question and the words of each of the second questions in the question groups are converted into the word vectors by the preset word vector model, so that the words are represented in the form of vectors, wherein the dimension of the word vector can be set to 300 dimensions.

In step S1023: dot-multiplying each word vector of the first question by a word vector matrix of the second questions, obtaining dot product results corresponding to each word vector of the first question, the word vector matrix is composed of word vectors of the second questions.

The word vector matrix can be composed of each of the word vectors of the second questions. Each of the word vectors of the first question can be dot-multiplied with the word vector matrix, and the dot product results corresponding to each of the word vectors of the first question are obtained.

It is assumed that $q_1=(x_1,x_2,x_3, \ldots x_m)$ and $q_2(y_1,y_2,y_3,\ldots,y_n)$ are representations of the first question and the second question after they are transformed into the word vectors respectively, and the calculation process of the dot product results can be expressed as:

$$z_i^{(O)}=f(x_i \otimes q_2), i=1,2,\ldots,m.$$

Wherein m is a length of the first question after segmentation, that is, number of words obtained after the first question is segmented; n is a length of the second question after segmentation; $x_i$ is a word vector corresponding to the i-th word in the first question; $y_i$ is a word vector corresponding to the i-th word in the second question; $\otimes$ is a dot product symbol; $Z_i^{(O)}$ is a dot product result corresponding to the i-th word vector in the first question; f means mapping function.

In step S1024: inputting each of the dot product results into a trained deep neural network model, and obtaining the first probabilities of the first classification label corresponding to each of the question groups.

After each of the dot product results are input into the trained deep neural network model, the deep neural network model performs feature extraction and classification calculation on the dot product result, to obtain the first classification label corresponding to each of the question groups, and the first probabilities of the first classification label. The first classification label is used to indicate the similarity between the first question and the second question in the question group. If the first classification label corresponding to the question group A is 4, it means that the first question and the second question in the question group A are similar, that is, the contents of the first question and the second question in question group A are very similar, except that the way of asking questions is slightly different. If the first classification label corresponding to the question group B is 3, it means that the first, second and third categories of the first question are the same as the first, second and third categories of the second question, in the question group B. If the first classification label corresponding to the question group C is 2, it means that the first and second categories of the first question are the same as the first and second categories of the second question, in the question group C. If the first classification label corresponding to the question group D is 1. it means that the first category of the first question is the same as the first category of the second question, in the question group D. In other cases, the first classification label corresponding to the question group can be set to 0.

Preferably, in the embodiments of the present invention, the step of inputting each of the dot product results into the trained deep neural network model, and obtaining the first probabilities of the first classification label corresponding to each of the question groups, includes following steps S1024a to S1024d.

In step S1024a: inputting each of the dot product results into the trained deep neural network model, performing feature extraction on the dot product results, in a hidden layer of the trained deep neural network model, to obtain feature vectors, and inputting the feature vectors into an output layer of the trained deep neural network model.

After each of the dot product results are input into the trained deep neural network model, the hidden layer of the deep neural network model performs feature extraction on the dot product results to obtain the feature vectors, and inputs obtained feature vectors into the output layer, and the output layer performs classification and probability calculation on input feature vectors.

Wherein, the feature extraction process of the hidden layer of the deep neural network model can be expressed as:

$$z_i^{(l)} = \mathrm{relu}(W^{(l)} z_i^{(l-1)} + b^{(l)}), \ i=1,2,\ldots m, \ l=1,2,\ldots L.$$

Wherein, $Z_i^{(l)}$ represents a feature vector corresponding to the i-th dot product result in the l-th hidden layer; relu is an activation function; $W^{(l)}$ represents a weight matrix of the l-th hidden layer; $b^l$ represents a bias matrix of the l-th hidden layer; L is number of hidden layers, m is number of dot product results.

In step S1024b: inputting each word vector of the first question into a trained shallow neural network model, obtaining weight values corresponding to each word vector of the first question.

It is understandable that each word in the first question may have different importance. For example, the first question is segmented into words (robot, is, what), wherein the word "robot" should be more important than the word "is" and the word "what".

During the matching calculation process of the deep neural network model, the matching may be incorrect because the importance of each word is not distinguished, so the first classification classification label corresponding to each of the question groups is erroneously determined, and the first probability of the first classification label is erroneously calculated.

Therefore, in the embodiments of the present invention, the corresponding weight values are calculated for each word vector in the first question by the trained shallow neural network model, the importance of each word in the first question is distinguished by the weight value.

At the same time, the speed of data processing can be improved by using the shallow neural network model, and the weight values corresponding to each word vector can be calculated in a short time.

In step S1024c, inputting the weight values into the output layer of the trained deep neural network model, and assigning corresponding weight values to feature vectors of each of the dot product results respectively.

The weight values are input into the output layer of the depth neural network model, to assign corresponding weight values to feature vectors of each of the dot product results respectively. For example, the word vector of word A is A1, and the dot product calculated by the word vector A1 is A2, the weight value of the word vector A1 is A3, and the feature vector extracted from the dot product result A2 is A4, then the weight value corresponding to the feature vector A4 is A3.

Wherein, the weight value corresponding to the feature vector assigned to each of the dot product results can be expressed as:

$$s = \sum_{i=1}^{m} h_i z_i^{(L)}.$$

Wherein, $h_i$ represents a weight value corresponding to the i-th feature vector.

In step S1024d: calculating the first probabilities of the first classification label corresponding to each of the question groups, according to the feature vectors of each of the dot product results and the weight values corresponding to each of the feature vectors, in the output layer of the trained deep neural network model.

It is understandable that the first probabilities of the first classification label corresponding to each of the question groups can be calculated, according to the feature vectors of each of the dot product results and corresponding weight values, in the output layer of the trained deep neural network model.

Wherein, the process of calculating the first probabilities of the first classification label corresponding to each of the question groups according to the feature vectors of each of the dot product results and the weight values corresponding to each of the feature vectors can be expressed as:

$$O = W^{(L+1)} s + b^{(L+1)}.$$

Wherein, $O = (o_1, o_2, \ldots, o_C)$, C is number of categories, $o_i$ represents an output value of the i-th category; $W^{(L+1)}$ represents a weight matrix of the output layer; $b^{(L+1)}$ represents a bias matrix of the output layer.

It should be noted that the softmax function can be used when calculating the first probability of the first classification label in the output layer.

Further, after the dot product results corresponding to each word vector of the first question are obtained, the method further includes; filtering from large to small to retain a preset number of dot product results.

When entered first question contains too many words, many dot product results will be obtained. At this time, the preset number of dot product results can be filtered from large to small and remained. It is can not only filter out key words but also make the length of the first question into a fixed length. Wherein, the Mapping function of topK can be used during the filtering process.

The preset number can be selected according to the actual situation. For example, the preset number can be set to 10, and the maximum 10 dot product results are retained.

Figure 3:
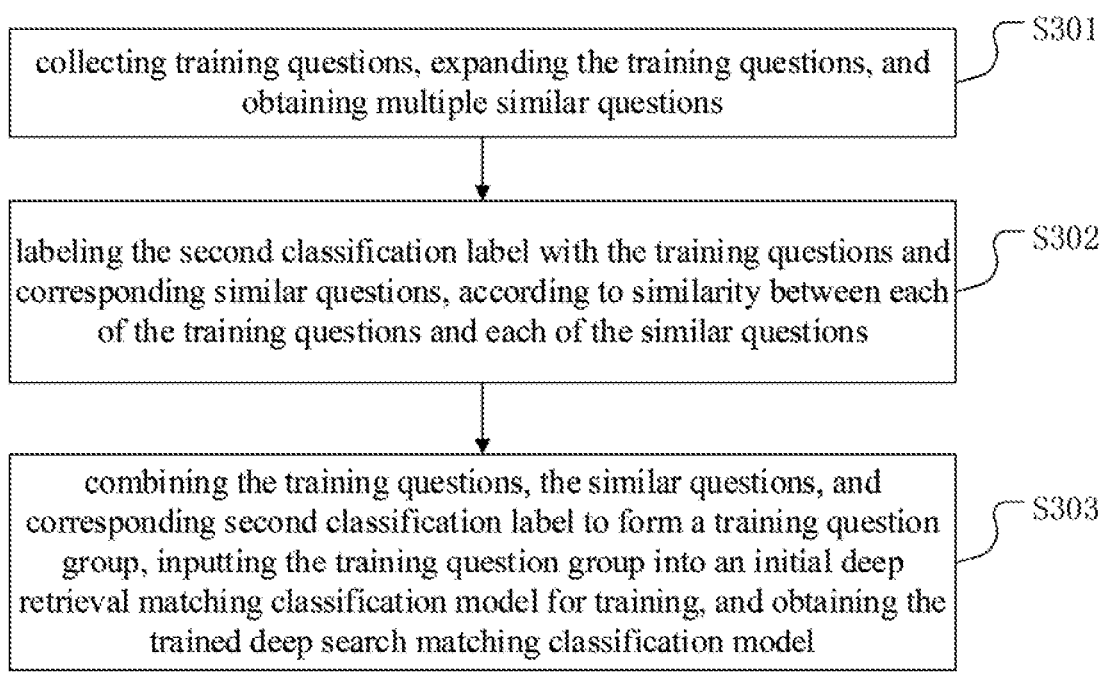
FIG. 3 is a flowchart of training the deep retrieval matching classification model of the question answering method in an application scenario according to an embodiment of the present invention.
Figure 4:
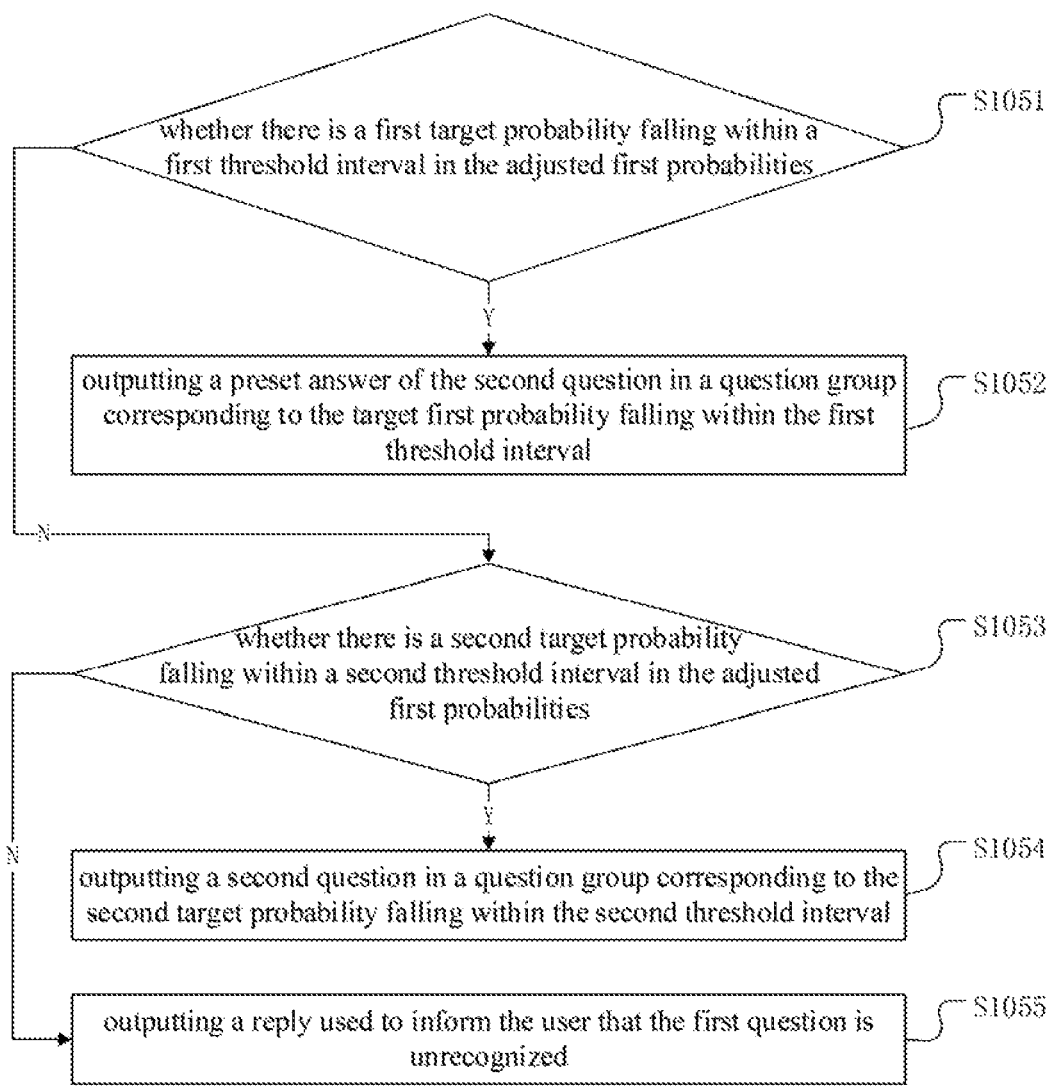
FIG. 4 is a flowchart of the question answering method in an application scenario according to an embodiment of the present invention.

Optionally, as shown in FIG. 3, in the embodiments of the present invention, the trained deep retrieval matching classification model is trained by the following steps S301 to S303.

In step S301: collecting training questions, expanding the training questions, and obtaining multiple similar questions.

In the embodiments of the present invention, historical question and answer data are obtained and preprocessed, and user's frequently asked questions are collected from the preprocessed historical question and answer data. The user's frequently asked questions are used as training questions for training. Wherein, preprocessing methods can include image detection, sensitive and forbidden word recognition, traditional and simplified conversions, expression recognition replacement, pinyin detection, etc. After the user's frequently asked questions are obtained, the user's frequently asked questions can be expanded. That is, the training questions are expanded to obtain a plurality of similar questions similar to each of the training questions, so as to expand the data samples for training to improve the training accuracy.

In step S302: labeling the second classification label with the training questions and corresponding similar questions, according to similarity between each of the training questions and each of the similar questions.

After a plurality of similar questions are obtained by expanding, labeling the second classification label are performed, according to the similarity between each of the training questions and each of the similar questions. For example, when the contents expressed by the training question S1 and the similar questions T1 are very similar, but the expression is slightly different, the second classification label corresponding to the training question S1 and the similar question T1 can be labeled to 4. Another example, when the first category, the second category and the third category of the training question S2 are the same as the first, second and third categories of the similar question T2, but the contents expressed are not very similar, the second classification label corresponding to the training question S2 and the similar question T2 can be labeled to 3. Another example, when the first category and the second category of the training question S3 are the same as the first category and the second category of the similar questions T3, but the third category of the training question S3 is different from the third category of the similar questions T3, the second classification label corresponding to the training question S3 and the similar question T3 can be labeled to 2. Another example, when the first category of the training question S4 is the same as the first category of the similar questions T4, but the second and third categories of the training question S4 are different from the second and third categories of the similar questions T4, the second classification label corresponding to the training question S4 and the similar question T4 can be labeled to 1. In other cases, the second classification label corresponding to the training question and the similar question can be labeled to 0.

In step S303: combining the training questions, the similar questions, and corresponding second classification label to form a training question group, inputting the training question group into an initial deep retrieval matching classification model for training, and obtaining the trained deep search matching classification model.

After the second classification labels corresponding to each of the training questions and each of the similar questions are obtained, the training questions, the similar questions and the corresponding second classification labels can be formed into training question groups. Wherein, the form of a question group can be expressed as (second classification label, training question, similar question). Each of the training question groups can be input into the initial deep retrieval matching classification model for training, and the trained deep search matching classification model is obtained.

During the training, the multi-classification loss function can be used to calculate the value of the loss function, and the weight matrix and the bias matrix of each layer of the depth neural network model can be updated by gradient optimization algorithms such as Adam algorithm.

Further, in the embodiments of the present invention, after the historical question and answer data are sorted out, the trained external word vector model can also be retrained by the historical question and answer data, to obtain the preset word vector model. That is, the trained external word vector model is obtained first, for example, an external word vector model trained by 120G corpus is obtained first, and then the external word vector model is trained again by collated historical question and answer data, to express the relationship between words more realistically, so that the preset word vector model can not only use the relationship between the words in the question and answer data, but also ensure the commonality of common words.

In step S103: determining a gradient boosting decision model corresponding to the first category, inputting the first question into the gradient boosting decision model, and obtaining a second category of the first question output by the gradient boosting decision model.

After the first category of the first question is obtained, the gradient boosting decision model corresponding to the first category can be determined. The gradient boosting decision model is a trained gradient boosting decision model. The first question is input into the gradient boosting decision model, to obtain the second category of the first question output by the gradient boosting decision model, that is, the second category of the first question predicted by the gradient boosting decision model, and the corresponding prediction probability are obtained.

Wherein, the gradient boosting decision models corresponding to each of the first categories can be obtained by the following steps S401 to S402.

In step S401: obtaining a second category of training questions corresponding to each of the first categories, and a second category of similar questions corresponding to each of the first categories.

In the embodiments of the present invention, after the training questions are obtained based on the historical question and answer data, and the training questions are expanded to obtain multiple similar questions, the training questions and the similar questions are classified according to the first category, so as to classify training questions and similar questions belonging to the same first category into the same category, and in each of the first categories, the second category of each of the training questions and the second category of each of the similar questions are obtained.

In step S402: converting the training questions, second categories corresponding to the training questions, the similar questions, and second categories corresponding to the similar questions into the corresponding digital expression respectively, inputting the digital expression into the initial gradient boosting decision model to train, and obtaining the trained gradient boosting decision model.

After the training questions and the similar questions in each of the first categories are obtained, the training questions and similar questions are segmented and a dictionary is constructed. After the word segmentation and the dictionary construction is completed, each word segmentation in each of the training questions is converted into a corresponding digital expression, and each word segmentation in each of the similar questions is converted into a corresponding digital expression. Wherein, the number in the converted digital expression is the index value of each word segmentation in the constructed dictionary. In addition, the corresponding numbers can be preset for each of the second categories, to implement digital expression. Accordingly, the second category of the training questions and the second category of the similar questions can be digitally converted respectively, according to the numbers corresponding to each of the second categories.

After digital expression of each of the training questions, digital expression of each of the similar questions, and digital expression of corresponding second categories are obtained, the digital expression of the training questions and digital expression of second categories corresponding to the training questions are input into the initial gradient boosting decision model for training, the digital expression of the similar questions and digital expression of second categories corresponding to the similar questions are also input into the initial gradient boosting decision model for training, and the trained gradient boosting decision model is obtained.

For example, a training question is "I am a teacher", and a similar question is "I am a school teacher", after the training question and the similar question are segmented, obtained word segmentation results are [I, am, a, teacher] and [I, am, school teacher], and the dictionary constructed based on this is [I, am, a, teacher, school teacher]. Wherein, the index value of "I" in the constructed dictionary is 0, the index value of "am" in the constructed dictionary is 1, the index value of "a" in the constructed dictionary is 2, the index value of "teacher" in the constructed dictionary is 3, the index value of "school teacher" in the constructed dictionary is 4. In addition, 0 corresponding to the second category (teacher), 1 corresponding to the second category (doctor), and 2 corresponding to the second category (serviceman) are preseted. Thus the training question and the second category corresponding to the training question are converted into the digital expression ((0, 1, 2, 3), 0), the similar question and the second category corresponding to the similar question are converted into the digital expression ((0, 1,4), 0), and then ((0, 1, 2, 3), 0) and ((0, 1, 4), 0) are input into the initial gradient boosting decision model for training, and the trained gradient boosting decision model is obtained.

In the embodiments of the present invention, after the gradient boosting decision model corresponding to the first category is determined, and the training of the determined gradient boosting decision model is completed, the word segmentation is processed on the first question, and the stop words and punctuation are removed, then the first question is transformed into the corresponding digital expression according to the dictionary constructed during training, and the converted digital expression is input into the trained gradient boosting decision model, and then the second category of the first question output by the trained gradient boosting decision model can be obtained.

In step S104: obtaining a second category of the second questions in each of the question groups, and adjusting the first probability of the first classification label corresponding to each of the question groups, according to the second category of the second questions and the second category of the first question in each of the question groups.

In the embodiments of the present invention, the second question under each first category it the first category, the second category and the third category, and the first category, the second category, and the third category of each of the second questions are known. Accordingly after each second question in which the first category is the same as the first category of the first question is determined, and each of question groups are formed b combining the first question with each of the second questions, the second category of the second question in each of the question groups can be further obtained. After the second category of the first question output by the gradient boosting decision model is obtained, that is, after the second category of the first question predicted by the gradient boosting decision model is obtained, the second category of the second question in each question group is compared With the second category of the first question, so as to adjust the first probability of the first category label corresponding to each question group according to the comparison result. For example, the second category of the second question A in the question group A is compared with the second category of the first question, so as to adjust the first probability of the first classification label corresponding to the question group A according to the comparison result.

Further, in the embodiments of the present invention, the step of adjusting the first probability of the first classification label corresponding to each of the question groups, according to the second category of the second questions and the second category of the first question in each of the question groups, includes the following steps:

Step S1041: determining whether the second category of the second questions is the same as the second category of the tint question in the question groups;

Step S1042: in response to, determining that the second category of the second questions is the same as the second category of the first question in the question groups, weighting the first probabilities of the first classification label corresponding to the question groups according to a preset reward coefficient; and Step S1043: in response to determining that the second category of the second questions is different from the second category of the first question in the question groups, penalizing the first probabilities of the first classification label corresponding to the question groups according to a preset penalty coefficient.

For the above steps S1041 to S1043, understandably, after the second category of the second questions and the second category of the first question in each of the question groups are obtained, it can be determined whether the second category of each of the second questions is the same as the second category of the first question. If they are the same, the first probability of the first classification label corresponding to the corresponding question group is weighted, that is, the first probability is multiplied by the preset reward coefficient. If they are different, the first probability of the first classification label corresponding to the corresponding question group is punished, that is, the first probability is multiplied by the preset penalty coefficient. For example, if the second category of the second question in the question group A is different from the second category of the first question, the first probability A of the first classification label corresponding to the question group A is multiplied by the preset penalty coefficient, to punish it. For another example, if the second category of the second question in the question group B is the same as the second category of the first question, the first probability B of the first classification label corresponding to the question group B is multiplied by the preset reward coefficient, to weight it. The preset reward coefficient is greater than the preset penalty coefficient.

Understandably, in the embodiments of the present invention, after the first probabilities of the first classification label corresponding to each of the question groups output by the deep retrieval matching classification model are obtained, the question groups are sorted according to the first classification label. For example, the question groups are sorted in descending order according to the first classification label 4, 3, 2, 1 and 0, the question group with the first classification label 4 is ranked first, and the question group with the first classification label 0 is sorted last. When the first classification labels are the same, the question groups can be sorted in descending order again according to the first probability. That is, when the first classification labels are the same, the ranking with the highest probability is the first, and the ranking with the lowest probability is the last, so as to get the question groups with the descending order. When judging whether the second category of each second question is the same as the second category of the first question, the preset number of question groups in the first order are compared, so as to reduce the number of comparisons, and improve the matching speed and matching efficiency, such as the top 50 question groups are selected for comparison, or the question groups with the first classification label 4 are selected fir comparison, or the question groups with the first classification label 4 and 3 are selected for comparison, etc.

Preferably, in the embodiments of the present invention, the step of inputting the first question into the gradient boosting decision model, and obtaining the second category of the first question output by the gradient boosting decision model, includes: inputting the first question into the gradient boosting decision model, and obtaining the second category of the first question and a second probability corresponding to the second category of the first question output by the gradient boosting decision model. The second probability is a predicted probability value of the second category of the first question. The gradient boosting decision model not only predicts the second category of the first question, but also outputs the probability of the second category of the first question. The gradient boosting decision model is also a classification model, but the classification object of the gradient boosting decision, model is different from that of the deep retrieval matching classification model. The classification object of the deep retrieval matching model is the degree of similarity between the first question and the second question. The number of labels of the second category of the first question predicted by the gradient boosting decision model varies with the first category.

Correspondingly, after the step of obtaining the second category of the first question and the second probability corresponding to the second category of the first question output by the gradient boosting decision model, the method further includes:

determining the preset reward coefficient and the preset penalty coefficient, according to the first probability, the second probability, and a preset threshold interval.

Understandably, its the embodiments of the present invention, after the first probability of the first classification label, corresponding to each of the question groups output by the deep retrieval matching classification model, the second probability corresponding to the second category of the first question output by the gradient boosting decision model, and the preset threshold interval determined according to the business needs are obtained, the preset reward coefficient and the preset penalty coefficient are determined according to the first probability, the second probability, and the preset threshold interval. When determining the preset reward coefficient and the preset penalty coefficient, the selected first probability may be the first probability with the maximum median of the first classification label corresponding to each question group.

Specifically, in the embodiments of the present invention, after the second probability corresponding to the second category of the first question output by the gradient boosting decision model is obtained, the second probability can be averaged, so as to ignore the influence of the number of categories.

The second probability is averaged by the following formula (1):

$$y = 1/\exp^{-(m-1/n)(1/n)} \quad (1)$$

Wherein, y is a result of averaging processing on the second probability, n is number of the second category in the first category of the first question, and m is the second probability.

In a specific application scenario, when the preset threshold interval determined according to the specific business needs is: the first preset threshold interval is [0.8, 1], the second preset threshold interval is [0.6, 0.8), the preset reward coefficient and the preset punishment coefficient can be determined according to the following formulas (2), (3) and (4):

$$1.0 >= 1/\exp^{-(x_1 * y * r)} \geq 0.8 \quad (2)$$

$$0.8 > 1/\exp^{-(x_2 * y * r)} \geq 0.6 \quad (3)$$

$$0.8 > x_3 * 1/\exp^{-(x_2 * y * r)} \geq 0.6 \quad (4)$$

Wherein, y is the result of the averaging processing on the second probability, r is the first probability, $x_1$ the preset reward coefficient, $x_2$ is a harmonic coefficient, is the preset punishment coefficient, and the harmonic coefficient x can be used as a benchmark to assist in determining, the preset reward coefficient and the preset penalty coefficient.

In step S105: outputting a reply corresponding to the first probabilities for the user, according to adjusted first probabilities.

Understandably, after the adjusted first probability is obtained, the corresponding reply is returned to the use according to the adjusted first probability, for example, a preset answer of a second question corresponding to a question group with the highest first probability is returned to the user.

Specifically, in the embodiments of the present invention, the step of outputting the reply corresponding to the first probabilities for the user, according to the adjusted first probabilities, includes the following steps S1051 to S1055.

In step S1051: determining whether there is a first target probability falling within a first threshold interval in the adjusted first probabilities.

In step S1052: in response to determining that there is the first target probability falling within the first threshold interval in the adjusted first probabilities, outputting a preset answer of the second question in a question group corresponding to the target first probability falling within the first threshold interval.

In step S1053: in response to determining that there is not the first target probability falling within the first threshold interval in the adjusted first probabilities, determining whether there is a second target probability falling within a second threshold interval in the adjusted first probabilities.

In step S1054: in response to determining that there is the second target probability falling within the second threshold interval in the adjusted first probabilities, outputting a second question in a question group corresponding to the second target probability falling within the second threshold interval.

In step S1055: in response to determining that there is not the second target probability falling within the second threshold interval in the adjusted first probabilities, outputting a reply used to inform the user that the first question is unrecognized.

In the embodiments of the present invention, the first threshold interval and the second threshold interval can be determined according to the specific business needs, such as the first threshold interval is determined as [0.8, 1], the second threshold interval is determined as [0.6, 0.8).

For the above steps S1501 to S1505, understandably, after the adjusted first probability is obtained, determining whether the adjusted first probabilities have a first target probability that is within the first threshold interval [0.8, 1]. If there is a first target probability 0.9 in the adjusted first probabilities, it can be determined that the adjusted first probability 0.9 (that is, the first target probability 0.9) is within the first threshold interval [0.8, 1], a question group corresponding to the adjusted first probability 0.9 can be determined first, when it is determined that the question group corresponding, to the adjusted first probability 0.9 is the question group A, a preset answer corresponding to the second question A in the question group A is output for the user. If there are multiple first probabilities within the first threshold interval, a preset answer of a second question in as question group corresponding, to the maximum first probability is output for the user. If the adjusted first probability does not have the first target probability within the first threshold interval [0.8, 1], but there is a second target probability in the second threshold interval [0.6, 0.8), for example, if the adjusted first probabilities include 0.61, 0.7, 0.73 and 0.75, the question group B corresponding to the adjusted first probability 0.61 (that is, the second target probability 0.61), the question group C corresponding to the adjusted first probability 0.7 that is, the second target probability 0.7), the question group D corresponding to the adjusted first probability 0.73 that is, the second target probability 0.73), and question group E corresponding to the adjusted first probability 0.75 (that, is, the second target probability 0.754 are determined, then the second question B the question group B, the second question C in the question group C, the second question D in the question group D, and the second question E in the question group F can be further obtained, and then the second, question B, the second question C, the second question D, and the second question E are output for the user, such as, are sent to the user's terminal, are displayed on the screen of the terminal, or are played, etc.

Wherein, when the second questions are output for the user, the second questions are sorted in the descending order according to the adjusted first probability and output for the user, for example, (the second question E, the second question D, the second question C, the second question B) obtained by sorting in the descending order are returned to the user, so that the second question which is most similar to the first question is ranked first. Accordingly, the user can quickly find the desired reply content, the relevance of the returned result is improved, and the user experience is improved.

Understandably, when there are many first probabilities falling within the second threshold interval [0.6, 0.8), and resulting in there are many determined second questions, after the second questions are sorted in descending order, a preset number of second questions are selected front the second questions sorted in descending order and returned to the user. For example, when the determined second questions are sorted in descending order as (the second question E, the second question D, the second question C, the second question B, the second question F, the second question G, the second question A, the second question H), if the preset number determined according to the actual situation is H), the second question E, the second question D, the second question C, the second question B, the second question F) are selected and returned to the user.

In the embodiments of the present invention, if all of the adjusted first probabilities are neither within the first threshold interval [0.8, 1], nor within the second threshold interval [0.6, 0.8), it is confirmed that the first question cannot be recognized, that is, the first question entered by the user does not conform to the specification, or the reply result of the first question cannot be found. At this time, the reply used to indicate that the first problem cannot be recognized is returned to the user, such as "Sorry, I don't understand what you mean, please try another way", etc.

It should be noted, in the embodiments of the present invention, after judging whether the second category of a second question is the same as the second category of the first question, and the corresponding weighting or punishment processing is carried out according to the judgment result, in order to obtain the adjusted first probability, it is immediately judged whether the adjusted first probability is within the first threshold interval. If the adjusted first probability is within the first threshold interval, the question group corresponding to the adjusted first probability can be directly determined, and the preset answer corresponding to the second question in the determined question group is returned to the user, the processing flow is ended, and no further judgment is performed, so as to improve the determination speed and efficiency of the reply content. Accordingly, the response speed and efficiency of the question reply is improved, and the user experience is improved.

In the embodiments of the present invention, after the first question and the first category of the first question entered by the user are obtained, the question groups are formed by combining the first question with each of the preset second questions corresponding to the first category respectively, the question groups are input into the trained deep retrieval matching classification model, and the first probabilities of the first classification label corresponding to each of the question groups are obtained; at the same time, the gradient promotion decision model corresponding to the first category also be determined, and the first question is input into the gradient boosting decision model, the second category of the first question is obtained; and the second category of the second questions in each of the question groups is obtained, the first probabilities of the first classification label corresponding to each of the question groups are adjusted according to the second category of the second questions and the second category of the first question in each of the question groups, and the reply corresponding to the first probabilities is output according to the adjusted first probabilities. Thus, the consultation result is accurately determined by the deep retrieval matching classification model and the gradient boosting decision model, the reply accuracy of the intelligent customer service is improved, the problems of the low matching precision, the poor correlation of reply, and the low reply accuracy in the existing intelligent customer service technology are solved, and the user experience is improved.

It should be understood that the size of the sequence numbers of the steps in the above embodiments does not mean the order of execution. The execution order of each process should be determined by its function and inherent logic, and should not constitute any limitation on the implementation process of the embodiment of the present invention.

The above mainly describes the question answering method, and a question answering device will be described in detail below.

Figure 5:
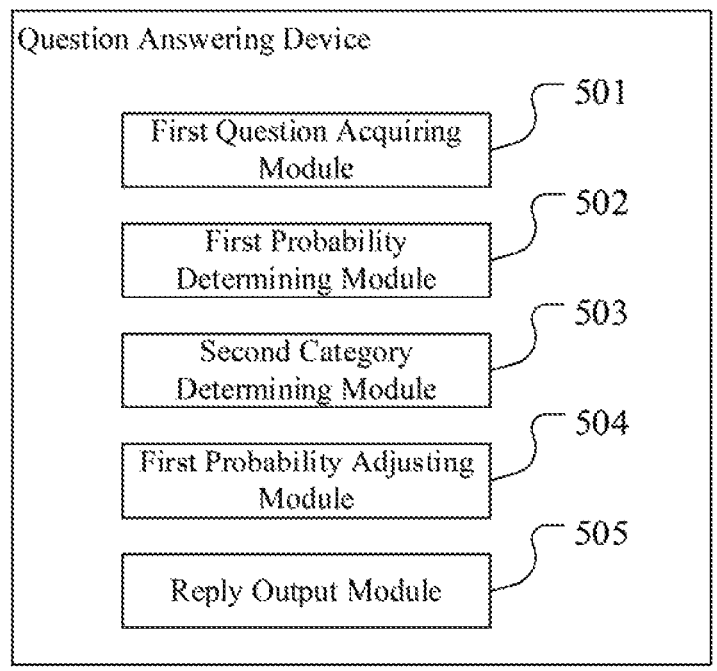
FIG. 5 is a structural diagram of an embodiment of a question answering device according to an embodiment of the present invention.

FIG. 5 shows a structural diagram of an embodiment of a question answering device according to an embodiment of the present invention. As shown in FIG. 5, the question answering device includes: a first question acquiring module 501, a first probability determining module 502, a second category determining module 503, a first probability adjusting module 504, and a reply output module 505.

The first question acquiring module 501 is used for obtaining a first question and a first category of the first question input by an user.

The first probability determining module 502 is used for combining the first question with each of preset second questions corresponding to the first category respectively to form question groups, inputting the question groups into a trained deep retrieval matching classification model, and obtaining a first probability of a first classification label corresponding to each of the question groups output by the trained deep retrieval matching classification model.

The second category determining module 503 is used for determining a gradient boosting decision model corresponding to the first category, inputting the first question into the gradient boosting decision model, and obtaining a second category of the first question output by the gradient boosting decision model.

The first probability adjusting module 504 is used for obtaining a second category of the second questions in each of the question groups, and adjusting the first probability of the first classification label corresponding to each of the question groups, according to the second category of the second questions and the second category of the first question in each of the question groups.

The reply output module 505 is used for outputting a reply corresponding to the first probabilities for the user, according to adjusted first probabilities.

Further, the first probability determining module 502 includes:

a question group determining unit, used for segmenting the first question, obtaining a plurality of words, and combining segmented first question with each of the preset second questions corresponding to the first category respectively to form the question groups, wherein the preset second questions have been segmented;

a vector converting unit, used for converting words of the first question and words of the second questions in each of the question groups into word vectors by a preset word vector model;

a dot product calculating unit, used for dot-multiplying each word vector of the first question by a word vector matrix of the second questions, obtaining dot product results corresponding to each word vector of the first question, the word vector matrix is composed of word vectors of the second questions; and a first probability determining unit, used for inputting each of the dot product results into a trained deep neural network model, and obtaining the first probabilities of the first classification label corresponding to each of the question groups.

Preferably, the first probability determining unit includes:

a feature extraction subunit, used for inputting each of the dot product results into the trained deep neural network model, performing feature extraction on the dot product results, in a hidden layer of the trained deep neural network model, to obtain feature vectors, and inputting the feature vectors into an output layer of the trained deep neural network model;

a weight value acquiring subunit, used for inputting each word vector of the first question into a trained shallow neural network model, obtaining weight values corresponding to each word vector of the first question;

a weight value input subunit, used for inputting the weight values into the output layer of the trained deep neural network model, and assigning corresponding weight values to feature vectors of each of the dot product results respectively; and a first probability calculating subunit, used for calculating the first probabilities of the first classification label corresponding to each of the question groups, according to the feature vectors of each of the dot product results and the weight values corresponding to each of the feature vectors, in the output layer of the trained deep neural network model.

Optionally, the question answering device further includes:

a training question collecting module, used for collecting training questions, expanding the training questions, and obtaining multiple similar questions;

a classification label labeling module, used for labeling the second classification label with the training questions and corresponding similar questions, according to similarity between each of the training questions and each of the similar questions; and a training module, used for combining the training questions, the similar questions, and corresponding second classification label to form a training question group, inputting the training question group into an initial deep retrieval matching classification model for training, and obtaining the trained deep search matching classification model.

Further, the first probability adjusting module 504 includes:

a category judging unit, used for determining whether the second category of the second questions is the same as the second category of the first question in the question groups;

a weighted processing unit, used for weighting the first probabilities of the first classification label corresponding to the question groups according to a preset reward coefficient, in response to determining that, the second category of the second questions is the same as the second category of the first question in the question groups; and a punishment processing unit, used for penalizing the first probabilities of the first classification label corresponding to the question groups according to a preset penalty coefficient, in response to determining that the second category of the second questions is different from the second category of the first question in the question groups.

Preferably, the second category determining module 503 is further used for inputting the first question into the gradient boosting decision model, and obtaining the second category of the first question and a second probability corresponding to the second category of the first question output by the gradient boosting decision model.

Correspondingly, the question answering device further includes:

a coefficient determining module, used for determining the preset reward coefficient and the preset penalty coefficient, according to the first probability, the second probability, and a preset threshold interval.

Optionally, the reply output module 505 includes:

a first threshold interval judging unit, used for determining whether there is a first target probability falling within a first threshold interval in the adjusted first probabilities;

a first reply output unit, used for outputting a preset answer of the second question in a question group corresponding to the target first probability falling within the first threshold interval, in response to determining that there is the tint target probability falling within the first threshold it in the adjusted first probabilities;

a second threshold interval judging unit used for determining whether there is a second target probability falling within a second threshold interval in the adjusted first probabilities, in response to determining that there is not the first target probability falling within the first threshold interval in the adjusted first probabilities;

second reply output unit, used for outputting a second question in a question group corresponding to the second target probability falling within the second threshold interval, in response to determining that there is the second target probability falling within the second threshold interval in the adjusted first probabilities; and a third reply output unit, used for outputting a reply used to inform the user that the first question is unrecognized, in response to determining that there is not the second target probability falling within the second threshold interval in the adjusted first probabilities.

Figure 6:
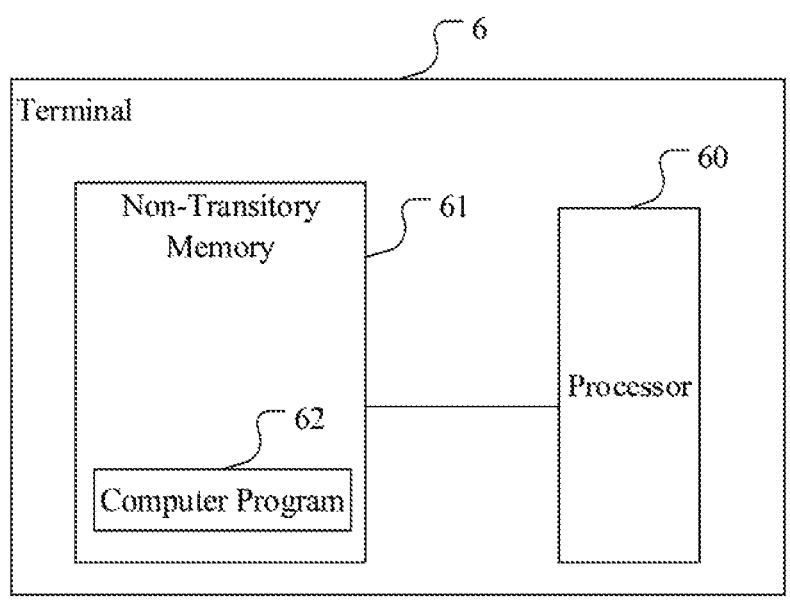
FIG. 6 is a schematic diagram of a terminal according to an embodiment of the present invention.

FIG. 6 is a schematic diagram of a terminal according to an embodiment of the present invention. As shown in FIG. 6, the terminal 6 of the embodiment includes a processor 60, a non-transitory memory 61, and a computer program 62 stored in the non-transitory memory 61 and executable on the processor 60, such as a question answering program. When the processor 60 executes the computer program 62, the steps in the above embodiments of the question answering method, are implemented, such as step S101 to step S105 shown in FIG. 1. In another embodiment, when the processor 60 executes the computer program 62, the function of each module, or unit in the above embodiments of the device implemented, such as the functions of module 501 to module 505.

In one embodiment, the computer program 62 can be divided into one or more modules/units that are stored in the non-transitory storage 61 and executable by the processor 60 to complete the present invention. The one or more modules/units may be a series of computer program instruction segments capable of performing a particular function, the instruction segments being used to describe the execution process of the computer program 62 in the terminal 6.

For example, the computer programs 62 can be divided into a first question acquiring module a first probability determining module, a second category determining module, a first probability adjusting module, and a reply output module, functions of each unit are as follows:

The first question acquiring module is used for obtaining a first question and a first category of the first question input by an user.

The first probability determining module is used for combining the first question with each of preset second questions corresponding to the first category respectively to form question groups, inputting the question groups into a trained deep retrieval matching classification model, and obtaining a first probability of a first classification label corresponding to each of the question groups output by the trained deep retrieval matching classification model.

The second category determining module is used for determining a gradient boosting decision model corresponding to the first category, inputting the first question into the gradient boosting decision model, and obtaining a second category of the first question output by the gradient boosting decision model.

The first probability adjusting module is used for obtaining a second category of the second questions in each of the question groups, and adjusting the first probability of the first classification label corresponding to each of the question groups, according to the second category of the second questions and the second category of the first question in each of the question groups.

The reply output module is used for outputting a reply corresponding to the first probabilities for the user, according to adjusted first probabilities.

The terminal 6 may be a computing device such as a desktop computer, a notebook, a palmtop computer, and a cloud server, etc. The terminal may include, but is not limited to, a processor 60 and a non-transitory memory 61. It will be understood by those skilled in the art that FIG. 6 is merely an example of the terminal 6, and does not limit the terminal 6, the terminal 6 may include components different in numbers from those illustrated, or a combination of some components, or different components. For example, the terminal 6 may also include an input and output device, a network access device, a bus, etc.

The processor 60 may be a central processing unit (CPU), a general purpose processor, a digital signal processor (DSP), an application specific integrated circuit (ASIC), a field-programmable gate array (FPGA), a programmable logic device, a discrete gate, a transistor logic device, or a discrete hardware component. The general purpose processor may be a microprocessor or any conventional processor or the like.

The non-transitory storage 61 may be an internal storage unit of the terminal 6, such as a hard disk or a memory of the terminal 6. The non-transitory storage 61 may be an external storage unit a the terminal 6, such as a plug-in hard disk, a smart memory card (SMC), a secure digital (SD) card, any suitable flash cards, etc, Furthermore, the non-transitory storage 61 may also include both an internal storage unit and an external storage device. The non-transitory storage 61 is used to store computer programs, other programs, and data required by the terminal. The non-transitory storage 61 can also be used to temporarily store data that have been output or is about to be output.

Those skilled in the art can clearly understand that, for the convenience and brevity of the description, the specific working processes of the systems, devices, and units described above, can refer to the corresponding processes in the embodiment of the method described above, and will not be described here.

In the embodiments above, the descriptions of the various, embodiments have their respective focuses. For parts that are not detailed or described in a certain embodiment, please refer to related descriptions in other embodiments.

A person skilled in the art will understand that the modules, units and/or method steps described in connection with the embodiments disclosed herein can be implemented by electronic hardware or a combination of computer software and electronic hardware. Whether these functions are performed in hardware or software depends on specific applications and design constraints of technical solutions. A professional technical person can use different methods for implementing the described functions for each particular application, but such implementation should not be considered to be beyond the scope of the present invention.

In the embodiments provided by the present invention, it should be understood that, the disclosed terminal, device and methods may be implemented in other ways. For example, the described device embodiment is merely exemplary. For example, the division of the units is merely based on logical functions, and the units may be divided with other approaches in practice. For example, multiple units or components may be combined, or integrated into another system, or some features can be ignored, or not implemented. In addition, the displayed or discussed mutual coupling or direct coupling or communication connection may be indirect coupling or communication connection through some interfaces, devices or units, which may be electrical, mechanical or other forms.

The units described as separate components may be or may not be separated physically, the components shown as units may be or may not be physical units, i.e, the units may be located at one place or may be distributed onto multiple network units. All of or part of the units may be selected based on actual needs to implement the solutions according to the embodiments of the disclosure.

In addition, individual function units according to the embodiments of the disclosure may be integrated in one processing unit, or the units may exist separately, or two or more units may be integrated in one unit. The above integrated units can be implemented in the form of hardware or software functional units.

If the integrated unit is implemented in the form of software function unit and the software function unit is sold or used as separate products, the software function unit may also be stored in a computer readable storage medium. Based on such understanding, the present invention realizes all or part of the flow in the above embodiment method, and can also be accomplished by instructing the relevant hardware through a computer program. The computer software product is stored in a computer readable storage medium, when the computer program is executed by the processor, the steps of the foregoing method embodiments can be implemented. Wherein, the computer program includes computer program code, and the computer program code may be in the form of a source code, an object code, an executable file, or some intermediate form, etc. The computer readable storage medium includes any entity or device capable of carrying the computer program code, recording medium, USB disk, mobile hard disk, magnetic disk, optical disk, computer memory, read-only memory (ROM), random access memory (RAM), electric carrier signals, telecommunication signals and software distribution medium, etc. It should be noted, the content contained in the computer readable medium may be appropriately increased or decreased according to the requirements of legislation and patent practice in the jurisdiction, for example, in some jurisdictions, in accordance with legislation and patent practice, the computer readable media does not include electric carrier signals and telecommunications signals.

As described above, the above embodiments are only used to illustrate the technical solution of the present invention, but not limited. Although the present invention has been described in detail with reference to the foregoing embodiments, those skilled in the art should understand that they can still modify the technical solutions described in the foregoing embodiments, or equivalently replace some of the technical features; and these modifications or replacements do not deviate the essence of the corresponding technical scheme from the spirit, and scope of the technical, scheme of the embodiments of the present invention.

What is claimed is:

1. A question answering method, applied to a terminal, the method comprising:
   obtaining a first question and a first category of the first question inputted by a user;
   combining the first question with each of preset second questions corresponding to the first category respectively to form question groups, inputting the question groups into a trained deep retrieval matching classification model, and obtaining a first probability of a first classification label corresponding to each of the question groups outputted by the trained deep retrieval matching classification model;
   determining a gradient boosting decision model corresponding to the first category, inputting the first question into the gradient boosting decision model, and obtaining a second category of the first question outputted by the gradient boosting decision model;
   obtaining a second category of the preset second questions in each of the question groups, and adjusting the first probability of the first classification label corresponding to each of the question groups, according to the second category of the preset second questions and the second category of the first question in each of the question groups; and
   outputting a reply corresponding to the first probabilities for the user, according to the adjusted first probabilities.

2. The question answering method as claimed in claim 1, wherein the step of combining the first question with each of the preset second questions corresponding to the first category respectively to form the question groups, inputting the question groups into the trained deep retrieval matching classification model, and obtaining the first probability of the first classification label corresponding to each of the question groups outputted by the trained deep retrieval matching classification model, comprises:
   segmenting the first question, obtaining a plurality of words, and combining segmented first question with each of the preset second questions corresponding to the first category respectively to form the question groups, wherein the preset second questions have been segmented;
   converting words of the first question and words of the preset second questions in each of the question groups into word vectors by a preset word vector model;
   dot-multiplying each word vector of the first question by a word vector matrix of the preset second questions, obtaining dot product results corresponding to each word vector of the first question, the word vector matrix is composed of word vectors of the preset second questions; and
   inputting each of the dot product results into a trained deep neural network model, and obtaining the first probabilities of the first classification label corresponding to each of the question groups.

3. The question answering method as claimed in claim 2, wherein the step of inputting each of the dot product results into the trained deep neural network model, obtaining the first probabilities of the first classification label corresponding to each of the question groups, comprises:
   inputting each of the dot product results into the trained deep neural network model, performing feature extraction on the dot product results, in a hidden layer of the trained deep neural network model, to obtain feature vectors, and inputting the feature vectors into an output layer of the trained deep neural network model;
   inputting each word vector of the first question into a trained shallow neural network model, obtaining weight values corresponding to each word vector of the first question;
   inputting the weight values into the output layer of the trained deep neural network model, and assigning corresponding weight values to feature vectors of each of the dot product results respectively; and
   calculating the first probabilities of the first classification label corresponding to each of the question groups, according to the feature vectors of each of the dot product results and the weight values corresponding to each of the feature vectors, in the output layer of the trained deep neural network model.

4. The question answering method as claimed in claim 2, wherein between the step of obtaining the dot product results corresponding to each word vector of the first question, and the step of inputting each of the dot product results into the trained deep neural network model, the method further comprises:
   filtering from large to small to retain a preset number of the dot product results.

5. The question answering method as claimed in claim 2, wherein the gradient boosting decision model is a trained gradient boosting decision model trained by following steps:

obtaining a second category of training questions corresponding to each of first categories, and a second category of similar questions corresponding to each of the first categories;

converting the training questions, second categories corresponding to the training questions, the similar questions, and second categories corresponding to the similar questions into corresponding digital expression respectively; and inputting the digital expression into an initial gradient boosting decision model to tram, and obtaining the trained gradient boosting decision model.

6. The question answering method as claimed in claim 1, wherein the trained deep retrieval matching classification model is trained by the following steps:

collecting training questions, expanding the training questions, and obtaining multiple similar questions;

labeling the second classification label with the training questions and corresponding similar questions, according to similarity between each of the training questions and each of the similar questions; and combining the training questions, the similar questions, and corresponding second classification label to form a training question group, inputting the training question group into an initial deep retrieval matching classification model for training, and obtaining the trained deep search matching classification model.

7. The question answering method as claimed in claim 1, wherein the step of adjusting the first probability of the first classification label corresponding to each of the question groups, according to the second category of the preset second questions and the second category of the first question in each of the question groups, comprises:

determining whether the second category of the preset second questions is the same as the second category of the first question in the question groups;

in response to determining that the second category of the preset second questions is the same as the second category of the first question in the question groups, weighting the first probabilities of the first classification label corresponding to the question groups according to a preset reward coefficient; and in response to determining that the second category of the preset second questions is different from the second category of the first question in the question groups, penalizing the first probabilities of the first classification label corresponding to the question groups according to a preset penalty coefficient.

8. The question answering method as claimed in claim 7, wherein the step of inputting the first question into the gradient boosting decision model, and obtaining the second category of the first question outputted by the gradient boosting decision model, comprises:

inputting the first question into the gradient boosting decision model, and obtaining the second category of the first question and a second probability corresponding to the second category of the first question outputted by the gradient boosting decision model;

after the step of obtaining the second category of the first question and the second probability corresponding to the second category of the first question outputted by the gradient boosting decision model, the method further comprises:

determining the preset reward coefficient and the preset penalty coefficient, according to the first probability, the second probability, and a preset threshold interval.

9. The question answering method as claimed in claim 1, wherein the step of outputting the reply corresponding to the first probabilities for the user, according to the adjusted first probabilities, comprises:

determining whether there is a first target probability falling within a first threshold interval in the adjusted first probabilities;

in response to determining that there is the first target probability falling within the first threshold interval in the adjusted first probabilities, outputting a preset answer of the preset second question in a question group corresponding to the target first probability falling within the first threshold interval;

in response to determining that there is not the first target probability falling within the first threshold interval in the adjusted first probabilities, determining whether there is a second target probability falling within a second threshold interval in the adjusted first probabilities;

in response to determining that there is the second target probability falling within the second threshold interval in the adjusted first probabilities, outputting a second question in a question group corresponding to the second target probability falling within the second threshold interval; and in response to determining that there is not the second target probability falling within the second threshold interval in the adjusted first probabilities, outputting a reply used to inform the user that the first question is unrecognized.

10. A terminal, comprising a processor and a non-transitory storage storing computer programs which when executed by the processor cause the processor to perform following steps:

obtaining a first question and a first category of the first question inputted by a user;

combining the first question with each of preset second questions corresponding to the first categor respectively to form question groups, inputting the question groups into a trained deep retrieval matching classification model, and obtaining a first probability of a first classification label corresponding to each of the question groups outputted by the trained deep retrieval matching classification model;

determining a gradient boosting decision model corresponding to the first category, inputting the first question into the gradient boosting decision model, and obtaining a second category of the first question outputted by the gradient boosting decision model;

obtaining a second category of the preset second questions in each of the question groups, and adjusting the first probability of the first classification label corresponding to each of the question groups, according to the second category of the preset second questions and the second category of the first question in each of the question groups; and outputting a reply corresponding to the first probabilities for the user, according to the adjusted first probabilities.

11. The terminal as claimed in claim 10, wherein the step of combining the first question with each of the preset second questions corresponding to the first category respectively to form the question groups, inputting the question groups into the trained deep retrieval matching classification model, and obtaining the first probability of the first classification label corresponding to each of the question groups outputted the trained deep retrieval matching classification model, comprises:
- segmenting the first question, obtaining a plurality of words, and combining segmented first question with each of the preset second questions corresponding to the first category respectively to form the question groups, wherein the preset second questions have been segmented;
- converting words of the first question and words of the preset second questions in each of the question groups into word vectors by a preset word vector model;
- dot-multiplying each word vector of the first question by a word vector matrix of the preset second questions, obtaining dot product results corresponding to each word vector of the first question, the word vector matrix is composed of word vectors of the preset second questions; and
- inputting each of the dot product results into a trained deep neural network model, and obtaining the first probabilities of the first classification label corresponding to each of the question groups.

12. The terminal as claimed in claim 11, wherein the step of inputting each of the dot product results into the trained deep neural network model, obtaining the first probabilities of the first classification label corresponding to each of the question groups, comprises:
- inputting each of the dot product results into the trained deep neural network model, performing feature extraction on the dot product results, in a hidden layer of the trained deep neural network model, to obtain feature vectors, and inputting the feature vectors into an output layer of the trained deep neural network model;
- inputting each word vector of the first question into a trained shallow neural network model, obtaining weight values corresponding to each word vector of the first question;
- inputting the weight values into the output layer of the trained deep neural network model, and assigning corresponding weight values to feature vectors of each of the dot product results respectively; and
- calculating the first probabilities of the first classification label corresponding to each of the question groups, according to the feature vectors of each of the dot product results and the weight values corresponding to each of the feature vectors, in the output layer of the trained deep neural network model.

13. The terminal as claimed in claim 11, wherein between the step of obtaining the dot product results corresponding to each word vector of the first question, and the step of inputting each of the dot product results into the trained deep neural network model, the method further comprises:
- filtering from large to small to retain a preset number of the dot product results.

14. The terminal as claimed in claim 11, wherein the gradient boosting decision model is a trained gradient boosting decision model trained by following steps:
- obtaining a second category of training questions corresponding to each of first categories, and a second category of similar questions corresponding to each of the first categories;
- converting the training questions, second categories corresponding to the training questions, the similar questions, and second categories corresponding to the similar questions into corresponding digital expression respectively, and
- inputting the digital expression into an initial gradient boosting decision model to train, and obtaining the trained gradient boosting decision model.

15. The terminal as claimed in claim 10, wherein the trained deep retrieval matching classification model is trained by the following steps:
- collecting training questions, expanding the training questions, and obtaining multiple similar questions;
- labeling the second classification label with the training questions and corresponding similar questions, according to similarity between each of the training questions and each of the similar questions; and
- combining the training questions, the similar questions, and corresponding second classification label to form a training question group, inputting the training question group into an initial deep retrieval matching classification model for training, and obtaining the trained deep search matching classification model.

16. The terminal as claimed in claim 10, wherein the step of adjusting the first probability of the first classification label corresponding to each of the question groups, according to the second category of the preset second questions and the second category of the first question in each of the question groups, comprises:
- determining whether the second category of the preset second questions is the same as the second category of the first question in the question groups;
- in response to determining that the second category of the preset second questions is the same as the second category of the first question in the question groups, weighting the first probabilities of the first classification label corresponding to the question groups according to a preset reward coefficient; and
- in response to determining that the second category of the preset second questions is different from the second category of the first question in the question groups, penalizing the first probabilities of the first classification label corresponding to the question groups according to a preset penalty coefficient.

17. The terminal as claimed in claim 16, wherein the step of inputting the first question into the gradient boosting decision model, and obtaining the second category of the first question outputted by the gradient boosting decision model, comprises:
- inputting the first question into the gradient boosting decision model, and obtaining the second category of the first question and a second probability corresponding to the second category of the first question outputted by the gradient boosting decision model;
- after the step of obtaining the second category of the first question and the second probability corresponding to the second category of the first question outputted by the gradient boosting decision model, the method further comprises:
- determining the preset reward coefficient and the preset penalty coefficient, according to the first probability, the second probability, and a preset threshold interval.

18. The terminal as claimed in claim 10, wherein the step of outputting the reply corresponding to the first probabilities for the user, according to the adjusted first probabilities, comprises:
- determining whether there is a first target probability falling within a first threshold interval in the adjusted first probabilities;
- in response to determining that there is the first target probability falling within the first threshold interval in the adjusted first probabilities, outputting a preset answer of the preset second question in a question group corresponding to the target first probability falling within the first threshold interval;

in response to determining that there is not the first target probability falling within the first threshold interval in the adjusted first probabilities, determining whether there is a second target probability falling within a second threshold interval in the adjusted first probabilities;

in response to determining that there is the second target probability filling within the second threshold interval in the adjusted first probabilities, outputting a second question in a question group corresponding to the second target probability falling within the second threshold interval; and in response to determining that there is not the second target probability falling within the second threshold interval in the adjusted first probabilities, outputting a reply used to inform the user that the first question is unrecognized.

19. A non-transitory computer readable storage medium storing computer programs, wherein when the computer programs are executed by a processor, following steps are performed:

obtaining a first question and a first category of the first question inputted by a user;

combining the first question with each of preset second questions corresponding to the first category respectively to form question groups, inputting the question groups into a trained deep retrieval matching classification model, and obtaining a first probability of a first classification label corresponding to each of the question groups outputted by the trained deep retrieval matching classification model;

determining a gradient boosting decision model corresponding to the first category, inputting the first question into the gradient boosting decision model, and obtaining a second category of the first question outputted by the gradient boosting decision model;

obtaining a second category of the preset second questions in each of the question groups, and adjusting the first probability of the first classification label corresponding to each of the question groups, according to the second category of the preset second questions and the second category of the first question in each of the question groups; and outputting a reply corresponding to the first probabilities for the user, according to the adjusted first probabilities.

20. The non-transitory computer readable storage medium as claimed in claim 19, wherein the step of combining the first question with each of the preset second questions corresponding to the first category respectively to form the question groups, inputting the question groups into the trained deep retrieval matching classification model, and obtaining the first probability of the first classification label corresponding to each of the question groups outputted by the trained deep retrieval matching classification model, comprises:

segmenting the first question, obtaining a plurality of words, and combining segmented first question with each of the preset second questions corresponding to the first category respectively to form the question groups, wherein the preset second questions have been segmented;

converting words of the first question and words of the preset second questions in each of the question groups into word vectors by a preset word vector model;

dot-multiplying each word vector of the first question by a word vector matrix of the preset second questions, obtaining dot product results corresponding to each word vector of the first question, the word vector matrix is composed of word vectors of the preset second questions; and inputting each of the dot product results into a trained deep neural network model, and obtaining the first probabilities of the first classification label corresponding to each of the question groups.

* * * * *